United States Patent [19]

Fox

[11] Patent Number: 4,697,084

[45] Date of Patent: Sep. 29, 1987

[54] FIBER-TYPE DOSIMETER WITH IMPROVED ILLUMINATOR

[75] Inventor: Richard J. Fox, Oak Ridge, Tenn.

[73] Assignee: The United States of America as represented by the United States Department of Energy, Washington, D.C.

[21] Appl. No.: 812,706

[22] Filed: Dec. 23, 1985

[51] Int. Cl.[4] .......................... G01T 1/14; H01J 47/04
[52] U.S. Cl. ..................................... 250/376; 350/620
[58] Field of Search ....................... 250/376, 377, 378; 350/620

[56] References Cited

U.S. PATENT DOCUMENTS 3,064,526  11/1962  Lindsay ............................. 350/574
4,306,154  12/1981  Williams, Jr. et al. ............. 250/376

OTHER PUBLICATIONS

V. V. Novikov, V. K. Baranov, L. V. Valiléva and N. N. Protasov, "Cassegrain System Modified for Solar Concentrators" *Appl. Solar Energy*, (U.S.A.), vol. 2, No. 5, (Sep.-Oct. 1966), pp. 10–12.
O. G. Landsverk, "A Survey Meter for the Measurement of Alpha, Beta, and Gamma Rays, Fast and Slow Neutrons", *U.S. Atomic Energy Commission No. MDDC*-396 (declassified Oct. 28, 1946), pp. 1–11.

*Primary Examiner*—Janice A. Howell
*Assistant Examiner*—Constantine Hannaher
*Attorney, Agent, or Firm*—David E. Breeden; Stephen D. Hamel; Judson R. Hightower

[57] ABSTRACT

A single-piece, molded plastic, Cassigrainian-type condenser arrangement is incorporated in a tubular-shaped personal pocket dosimeter of the type which combines an ionization chamber with an optically-read fiber electrometer to provide improved illumination of the electrometer fiber. The condenser routes incoming light from one end of the dosimeter tubular housing around a central axis charging pin assembly and focuses the light at low angles to the axis so that it falls within the acceptance angle of the electrometer fiber objective lens viewed through an eyepiece lens disposed in the opposite end of the dosimeter. This results in improved fiber illumination and fiber image contrast.

5 Claims, 4 Drawing Figures

4,697,084

FIBER-TYPE DOSIMETER WITH IMPROVED ILLUMINATOR

BACKGROUND OF THE INVENTION

This invention, which is a result of a contract with the U.S. Department of Energy, relates generally to portable ionizing radiation measuring devices.

More particularly, it relates to improvements in optically read, fiber-type radiation dosimeters wherein the position of the fiber of an electrometer used to measure the accumulated charge from an ionization chamber is viewed along a graduated reticle to measure the ionizing radiation dose.

Portable fiber-type radiation dosimeters, or pocket dosimeters as they are also called, are used worldwide as personal radiation dosimeters. These devices, which combine an ionization chamber with an optically read fiber electrometer, have been placed into mass production by the Federal Emergency Management Agency (FEMA). The FEMA dosimeter, described in U.S. Pat. No. 4,306,154, issued Dec. 15, 1981, details of which are incorporated herein by reference thereto, is constructed almost exclusively of thermoplastic material to reduce cost and provide interaction with ionizing radiation in a manner substantially similar to human flesh.

In the FEMA dosimeter a charging pin is provided at the light receiving end of the cylindrical-shaped dosimeter which slidably extends axially through the center of a condenser lens assembly for contact with the electrometer frame during charging. The pin is held by a flexible transparent diaphragm near the light receiving end of the dosimeter which has an axially extending, thick cylindrical portion which serves as a sealing surface about the charging pin. The condenser lens system is of the Galilean type in which a convex lens arrangement is used to focus light entering the light receiving end of the dosimeter cylinder onto the electrometer fiber. As originally conceived, these dosimeters suffer from rather poor fiber image contrast. Under certain lighting conditions, the fiber cannot be seen at all as it crosses the center of the field of view of the viewing microscope. Attempts to improve the image contrast by reducing the aperture of the viewing microscope further reduces the illumination through the system to unacceptably low levels for normal lighting conditions.

A careful examination of the FEMA dosimeter optical system revealed that the central rays of light from the condenser are obscured by the metal charging pin and the thick seal of the diaphragm. Thus, the fiber is illuminated by a thin hollow cone of light formed by light passing through only the periphery of the condenser lens system. The near-axial rays of light needed to fully illuminate the fiber are obstructed by the charging pin and seal arrangement. Further, the peripheral rays generally lie outside the acceptance angle of the microscope objective and also cause a relative increase in the light scattered from the fiber. The result is that the conditions for contrast reversal, or dark-field illumination (dark background, light fiber rather than light background, dark fiber) are approached.

Thus, it will be seen that there is a need for an improved illuminating system for a fiber-type pocket dosimeter which illuminates the fiber sufficiently for optical readout of the fiber position under normal lighting conditions.

SUMMARY OF THE INVENTION

In view of the above need, it is an object of this invention to provide a fiber-type dosimeter with improved illumination for optical readout.

Other objects and many of the attendant advantages of the present invention will be obvious from the following detailed description of the invention taken in conjunction with the drawings.

In accordance with one aspect of the invention improved illumination of the fiber of a fiber-type dosimeter is attained by replacing the conventional Galilean condenser system with a dual reflecting condenser system using total internal reflection and based on the Cassigrain principle which focuses light entering one end of the cylindrical-shaped dosimeter around a central axis charging pin end at low angles to the axis of the cylinder so that it falls within the acceptance angle of an objective lens of a viewing microscope positioned in the opposite end of the cylinder to visualize the image of the fiber of an electrometer disposed between the condenser and the objective lens. The dual reflecting condenser is formed of a single molded piece of transparent plastic material. It has a first reflecting surface which is paraboloidal in shape and formed by the rear surface of the condenser which is finished to form an optical surface to reflect light entering through a front annular optically flat surface of the condenser. The reflected light is directed onto a second reflecting surface which is hyperboloidal in shape and formed by a recessed forward surface of the condenser within the front annulus so that light reflected from the first reflecting surface is further reflected through a light conducting stem extending from the back surface of the condenser centrally of the first reflecting surface and out an optically flat surface at the rearward extent of the stem. The single piece condenser system is formed by injection molding of the plastic material in a mold which has been machined with optically smooth surfaces to thereby form the required optical surfaces of the condenser.

According to another aspect of this invention further improvement in fiber image contrast is obtained by placing a slit stop at the rearward end of the condenser which is oriented with the slit through which the light passes parallel to the fiber plane. The slit stop is formed of an electrically conducting metal foil which also serves as a Faraday shield for the dosimeter ion chamber located behind the slit stop and in which the fiber electrometer is mounted.

DESCRIPTION OF THE PREFERRED EMBODIMENT

Figure 1:
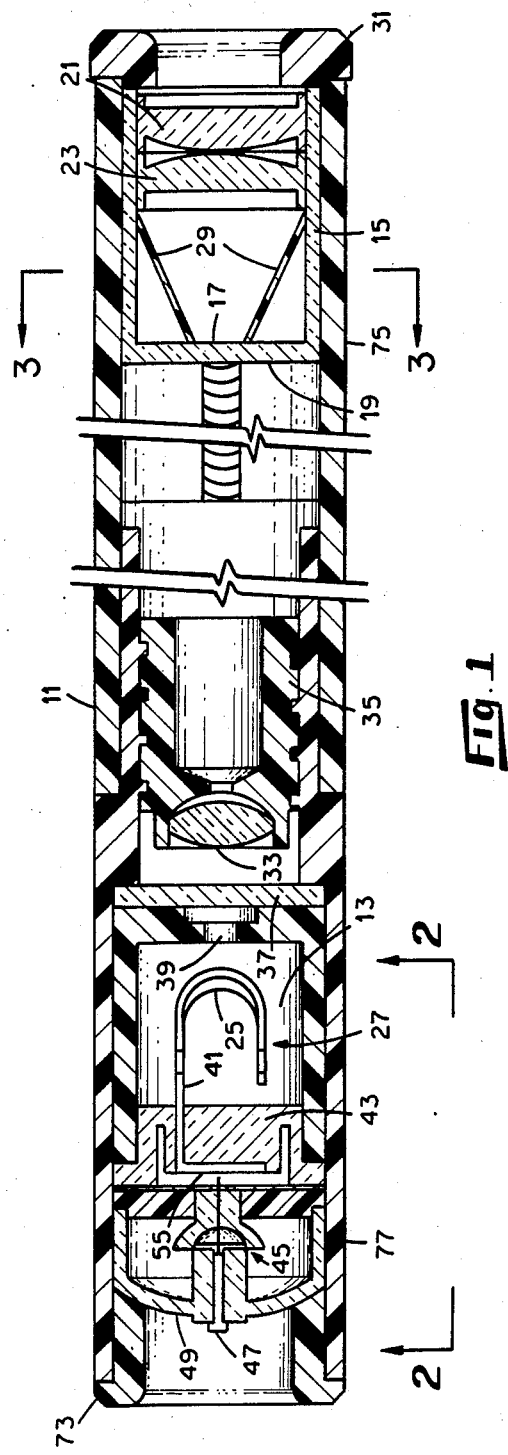
FIG. 1 is a longitudinal cross-sectional view of a fiber-type dosimeter incorporating the improvements according to this invention.

Referring now to FIG. 1, there is shown an improved dosimeter, in accordance with the present invention, comprising an opaque plastic, tubular-shaped casing or barrel 11 which is of a size and shape that can easily be carried in the pocket of a person. An ionization chamber 13 is disposed within the barrel 11. The ionization chamber is molded from materials such as carbon black filled polypropylene to make it highly conductive and responsive to a wide range of ionizing electromagnetic radiation energies regardless of the direction of the impinging radiation. By forming a substantial portion of the parts of the dosimeter from elements that have very low atomic numbers (i.e., carbon, hydrogen, and oxygen), the response to ionizing radiation is substantially the equivalent of animal or human tissue. Specific details of the materials from the various parts of the dosimeter may be had by referring to the above-referenced U.S. Pat. No. 4,306,154.

The viewing end of the barrel 11 is provided with an eyepiece cup 15 which is inserted into the end of the barrel against three support ribs (only one of which is shown in FIG. 1) provided in the inner wall of the barrel 11. The eyepiece cup 15 is formed of a transparent plastic material such as an acrylic resin (Du Pont resin 140) sold under the trademark "Lucite" by E. I. DuPont de Nemours and Co., Wilmington, Del. A scale 17 to measure the amount of radiation exposure in milliroentgens is molded into the base 19 of the cup 15. An enlarged view of the scale 17 is shown in FIG. 3. The scale 17 is molded in the base 19 of the cup 15 by means of a technique that produces raised images. When light passes through the plastic material, the refraction of light by the raised images forms a reticle image which is visible in the eyepiece. The cup 15 is provided with eyepiece lenses 21 and 23 of a microscope system used to view the image of a fiber 25 of an electrometer 27 (FIG. 2) and to measure its movement across the scale 17. The lenses 21 and 23 are molded of clear plastic material such as "Lucite" acrylic resin and positioned at the proper distance from the scale 17 by transparent "Lucite" acrylic resin spacers 29. The three component parts may be welded together by means of ultrasonic welding, inserted in the cup 15 and sealed into the viewing end of the dosimeter barrel 11 by means of a plastic cap 31. The cap 31 is fixed into position either by ultrasonic welding or by epoxy resin bonding.

An objective lens 33 is mounted in a lens holder 35 which is threadably disposed within the barrel 11 from the opposite end thereof and positioned precisely to view the image of the fiber 25 of the electrometer 27 through the eyepiece lens 23 and 21. A transparent resin window 37 is disposed between the lens holder 35 and the inward end of the ionization chamber 13 and is sealed to provide an air-tight seal at a central opening 39 in the end of the ionization chamber 13 through which the image of the fiber 25 may be seen. An aluminum frame 41 of the electrometer 27 is molded into an electrical insulator base 43. The insulator 43 is molded from a transparent plastic material, such as polystyrene alpha methylstyrene copolymer, Monsanto Cerix 250, and encloses the opposite end of the combined ionization chamber 13 and electrometer 27.

Figure 2:
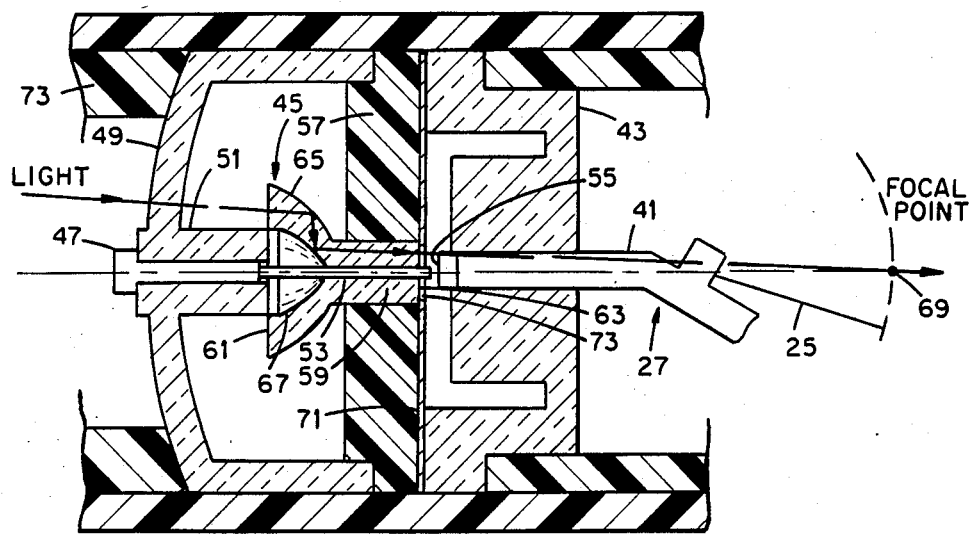
FIG. 2 is an enlarged cross-sectional view of the condenser arrangement according to the present invention including the electrometer and charging pin arrangement. This view is taken along the plane 2—2 of FIG. 1 and viewed in the direction indicated by the arrows.
Figure 3:
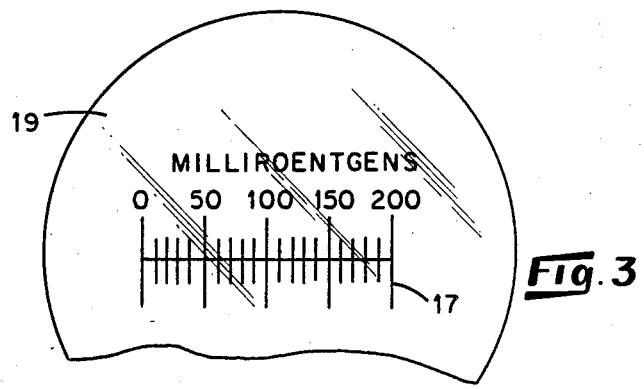
FIG. 3 is an enlarged view of a scale used to measure the electrometer fiber movement and is located in the bottom of the microscope eyepiece of FIG. 1.

Referring now to FIG. 2, there is shown an enlarged view of a condenser lens arrangement 45 in accordance with the improvement of this invention and its association with the electrometer base 43 and a central axis mounted charging pin 47. The charging pin 47 is held in a normally open contact position by means of a plastic diaphragm 49. The diaphragm 49 is a transparent cup-shaped member, made from clear polycarbonate, which fits into the light receiving end of the dosimeter barrel 11. The diaphragm is formed with a thick cylindrical section 51 at its center through which the charging pin 47 is inserted. The charging pin is sealed into the diaphragm 49 with an epoxy resin. The charging pin 47 has an inward extending portion 53 of smaller diameter than the remaining portion thereof which slidably extends through a central axis opening in the condenser 45 and terminates in close proximity to the base 55 of the electrometer frame 41.

To place an electrical charge on the electrometer 27, a charging contact (not shown) is inserted through the light receiving end of the barrel 11 which pushes against the head of the charging pin 47 moving the charging pin 47 inward into contact with the base 55 of the electrometer frame 41.

The light condenser 45 is held in place between the diaphragm base 43 and the electrometer base 43 by means of a cylindrical mounting disk 57 formed of an opaque plastic material. The disk 57 has a central opening therethrough sized to receive a stem portion 59 of the condenser 45 in a press fit arrangement to hold the condenser in precise optical alignment for focusing the light received about a front annular face 61 of the condenser 45 and transmitted out the back stem face 67 to a focal point 69 midway of the path of movement of the electrometer fiber 25. The surfaces 61 and 63 of the condenser 45 are optically flat surfaces to prevent scattering of the light passing into and out of the lens. The condenser 45 is molded by means of a process, described hereinbelow, which forms the required optical surfaces without additional polishing following the molding process. The back surface 65 of the condenser is paraboloidal in shape and forms a reflector from which paraxial light passing in through the annular face 61 is first reflected onto a second hyperboloidal surface 67. This surface 67 is formed in the bottom of a front recess of the condenser 45 which slidably receives the thick cylindrical section 51 of the diaphragm 49. The surface 67 is positioned relative to the first reflecting surface 65 so that the light reflected thereon is again reflected to pass through the light conducting stem 59 toward the fiber at low angles to the axis such that it is focused onto the focal point 69. The rays are thus concentrated and all lie within the acceptance angle of the microscope objective lens 33 (FIG. 1). The condenser 45 is formed of a clear acrylic resin, such as "Lucite" which has a refractive index of 1.4 thereby producing total internal reflection at the reflective surface boundaries with air filling the chamber about the lens.

An electrically conductive disc, such as a copper foil disc 71 is sandwiched between holder 57 and the electrometer base 43 which serves both as an electrostatic, or Faraday, shield for the electrometer and a slit stop for the light passing from the lens onto the electrometer fiber 25. The slit stop is formed by a slit 73 in the disc 71 at the light exiting surface 63 of the lens which has the longer dimension thereof parallel to the fiber plane. The slit stop increases the fiber image contrast significantly.

The ionization chamber 13, insulator base 43, shield disc 71, condenser mounting disk 57 including the condenser 45, and diaphragm 49 are press fitted together with the diaphragm 49 sealed to the mounting disk 57 with epoxy resin. This assembly is inserted into the light receiving end of the barrel 11 with the ionization chamber against the window 37 and the diaphragm sealed to the sides of the barrel 11 with epoxy resin. A grounding ring 73 formed of carbon fiber-loaded polycarbonate is fixed into the light receiving end of the barrel 11 and sealed using both ultrasonic welding and epoxy resin. The diaphragm 49 and grounding ring 73 provide an air-tight seal for the ionization chamber 13 from this end.

As shown in FIG. 1, the barrel 11 may be formed of two pieces 75 and 77 which differ in materials of construction in that piece 77 is formed of an electrically conductive plastic, such as carbon fiber-loaded polycarbonate. This provides a path for the electrostatic charge on the ionization chamber 13 and/or this section 77 of the barrel to flow to ground through the grounding ring 73 during charging of the electrometer 27. The charging device (not shown) includes a grounding tube which contacts the ring 73 when inserted into the light receiving end of the dosimeter to charge the electrometer as described above.

Figure 4:
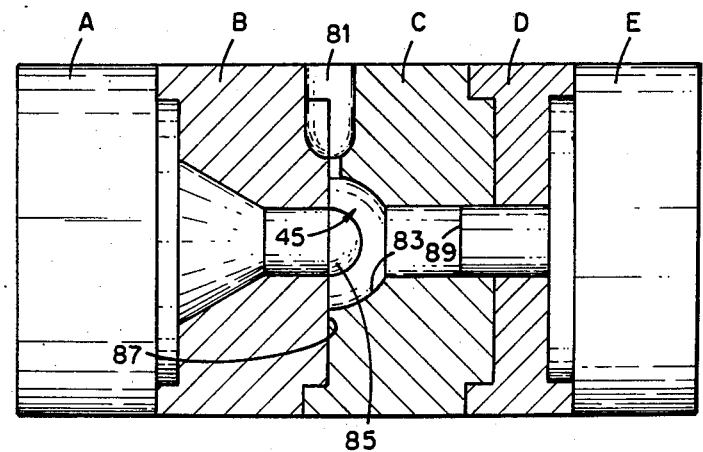
FIG. 4 is a partially cross-sectioned view of a five-piece mold assembly which may be used to mold the lens shown in FIGS. 1 and 2.

Referring now to FIG. 4, there is shown an assembled five-piece mold (pieces A, B, C, D & E) which may be used in the process of molding condenser lens 45. The mold pieces may be machined from aluminum and formed to fit together as shown so that the pieces may be pulled apart to remove the molded condenser. Molten acrylic resin is injected into the mold through an opening 81 formed between mold pieces B and C to fill the mold cavity for the condenser 45. The paraboloidally contoured surface 83 of mold piece C and the hyperboloidally contoured surface 85 of mold piece A, which form the condenser reflector surface 65 and 67, respectively, are machined by means of a numerically controlled, diamond cutting tool lathe in accordance with known machining control to form optically smooth contours of mirror finish quality. Further, the surface 87 of mold piece B and the surface 89 of mold piece E are lens polished flat to provide the optically flat front and rear surfaces 61 and 63, respectively, of the condenser 45. This molding process provides the required optically smooth surfaces without further lens polishing after removal of the lens from the mold.

Thus, it will be seen that a condensing system has been provided which greatly improves the illumination and image contrast of the electrometer fiber of a fiber-type dosimeter. Although the invention has been described by means of a specific illustration of the preferred embodiment, various modifications and changes may be made therein without departing from the spirit and scope of the following claims attached to and forming a part of this specification.

I claim:

1. In a dosimeter of the type comprising a tubular barrel, an ionization chamber disposed coaxially within said barrel and comprising an electrometer having a fiber supported by a frame, a microscope means disposed in a viewing end of said barrel for viewing the position of said fiber along a graduated scale, and means for charging said electrometer including a charging pin movably disposed along the axis of said barrel at the opposite light receiving end thereof, the improvement comprising:

a totally reflecting condenser disposed within said barrel concentrically about said charging pin, said condenser comprising a concave paraboloidal light reflecting surface having a light conducting path passing through the center of said concave paraboloidal reflecting surface and a convex hyperboloidal light reflecting surface, said concave paraboloidal surface disposed to receive light rays from said light receiving end of said barrel and reflect said light rays onto said hyperboloidal surface which is disposed to further reflect said light rays through said light path passing through said concave paraboloidal surface to a focal point coincident with the mid-scale position of said fiber.

2. The improvement of claim 1 wherein said condenser is a single molded piece formed of clear acrylic resin.

3. The improvement of claim 2 wherein said condenser includes a front optically flat annular surface having an inner diameter larger than said charging pin and disposed to receive paraxial light rays entering said light receiving end of said barrel, an optically smooth rear paraboloidal surface forming said paraboloidal reflecting surface, an optically smooth hyperboloidal surface formed in a front central recess of said condenser within said annular front surface forming said hyperboloidal reflecting surface at a position forward of said paraboloidal reflecting surface and a light conducting stem portion extending from the back of said condenser centrally of said back paraboloidal surface and terminating in an optically flat back surface from which said light rays pass out of said condenser.

4. The improvement of claim 3 further including a slit-stop means disposed between said condenser and said electrometer.

5. The improvement of claim 4 wherein said slit-stop means includes an opaque disk formed of an electrically conductive material for further providing an electrostatic shield for said electrometer and wherein the slit of said stop is disposed over said optically flat back surface of said condenser with the longer dimension thereof parallel to the plane of said fiber.

* * * * *